United States Patent
Butterstein et al.

(10) Patent No.: US 11,475,043 B2
(45) Date of Patent: Oct. 18, 2022

(54) MACHINE LEARNING BASED APPLICATION OF CHANGES IN A TARGET DATABASE SYSTEM

(71) Applicant: INTERNATIONAL BUSINESS MACHINES CORPORATION, Armonk, NY (US)

(72) Inventors: Dennis Butterstein, Stuttgart (DE); Adnan Ahmad, Stuttgart (DE); Jéssica Costa da Rocha, Odivelas Pontina (PT); Samy Tafasca, Courbevoie (FR); Vassil Radkov Dimov, Stuttgart (DE); Zeyuan Zhang, Munich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/192,913

(22) Filed: Mar. 5, 2021

(65) Prior Publication Data
US 2022/0284035 A1 Sep. 8, 2022

(51) Int. Cl.
*G06F 16/00* (2019.01)
*G06F 16/27* (2019.01)
*G06F 16/22* (2019.01)
*G06N 20/20* (2019.01)
(Continued)

(52) U.S. Cl.
CPC .......... *G06F 16/27* (2019.01); *G06F 11/3414* (2013.01); *G06F 16/2282* (2019.01); *G06F 16/235* (2019.01); *G06N 20/20* (2019.01)

(58) Field of Classification Search
CPC ..... G06F 16/27; G06F 16/2282; G06F 16/235
See application file for complete search history.

(56) References Cited

U.S. PATENT DOCUMENTS

| 7,321,904 | B2 | 1/2008 | Holenstein |
| 10,929,428 | B1 * | 2/2021 | Brahmadesam .... G06F 16/2379 |
| 2018/0253483 | A1 | 9/2018 | Lee |

(Continued)

FOREIGN PATENT DOCUMENTS

| CA | 1090419 A | 11/1980 |
| CA | 2459934 A1 | 3/2003 |
| CA | 2271444 C | 11/2005 |

OTHER PUBLICATIONS

Ferreira et al., "Self-tunable DBMS Replication with Reinforcement Learning", IFIP International Federation for Infomnation Processing 2020, Published by Springer Nature Switzerland AG 2020, A. Remke and V. Schiavoni (Eds.) DAIS 2020, LNCS 12135, https://doi.org/10.1007/978-3-030-50323-9_9, pp. 131-147.

(Continued)

*Primary Examiner* — Khanh B Pham
(74) *Attorney, Agent, or Firm* — Michael O'Keefe

(57) ABSTRACT

The present disclosure relates to a computer implemented method for applying changes into tables of a target database system using a data synchronization system, the data synchronization system being configured to automatically use at least one configurable parameter for applying a requested change in the target database system. The method provides a trained machine learning model, the machine learning model being configured to adjust the at least one configurable parameter based on a workload level. The method determines a current workload level at the target database system and uses the machine learning model for adjusting the at least one configurable parameter according to the determined workload level.

20 Claims, 8 Drawing Sheets

(51) Int. Cl.
*G06F 11/34* (2006.01)
*G06F 16/23* (2019.01)

(56) References Cited

U.S. PATENT DOCUMENTS

| | | | |
|---|---|---|---|
| 2020/0026714 A1 | 1/2020 | Brodt | |
| 2020/0348980 A1* | 11/2020 | Meiri | G06F 9/5061 |
| 2021/0021469 A1* | 1/2021 | Sondur | H04L 41/0843 |
| 2021/0201156 A1* | 7/2021 | Hafner | G06N 3/084 |
| 2021/0374523 A1* | 12/2021 | Gottin | G06F 16/22 |
| 2022/0083542 A1* | 3/2022 | Thiyagarajan | G06K 9/626 |
| 2022/0207414 A1* | 6/2022 | Bablani | G06K 9/6262 |

OTHER PUBLICATIONS

Klein et al., "Using Reinforcement Learning to Control Life Support Systems," SAE Technical Paper 2004-01-2439, Jul. 19, 2004, https://doi.org/10.4271/2004-01-2439.=, 15 pages.

Oracle Help Center, "TimesTen In-Memory Database Replication Guide", docs.oracle.com, [accessed Jan. 7, 2021, Retrieved from the Internet: <https://docs.oracle.com/database/121/TTREP/setup.htm#TTREP400>, 12 pages.

Spielberg et al., "Deep Reinforcement Learning Approaches for Process Control," IEEE, 2017 6th International Symposium on Advanced Control of Industrial Processes (AdCONIP), May 28-31, 2017, 6 pages.

Wikipedia, "Reinforcement learning," wikipedia.org, [accessed Feb. 8, 2021], Retrieved from the Internet: https://en.wikipedia.org/w/index.php?title=reinforcement_learning&oldid=913269479, 12 pages.

Zhang et al., "An End-to-End Automatic Cloud Database Tuning System Using Deep Reinforcement Learning." SIGMOD '19: Proceedings of the 2019 International Conference on Management of Data, Jun. 2019 https://doi.org/10.1145/3299869.3300085, 20 pages.

* cited by examiner

US 11,475,043 B2

MACHINE LEARNING BASED APPLICATION OF CHANGES IN A TARGET DATABASE SYSTEM

BACKGROUND

The present invention relates to the field of digital computer systems, and more specifically, to a method for applying changes in a target database system.

Replication is a process of maintaining a defined set of data in more than one location. It may involve copying designated changes from one source location to a target location, and synchronizing the data in both locations. The source and target can be in logical servers that are on the same machine or on different machines in a distributed network. Several approaches exist for moving data from one system to another. However, these approaches may need further improvement.

SUMMARY

Various embodiments provide a method for applying changes in a target database system, computer system and computer program product as described by the subject matter of the independent claims. Advantageous embodiments are described in the dependent claims. Embodiments of the present invention can be freely combined with each other if they are not mutually exclusive.

In one aspect, the invention relates to a computer implemented method for applying changes into tables of a target database system using a data synchronization system, the data synchronization system being configured to automatically use at least one configurable parameter for applying a requested change in the target database system. The method comprises: providing a trained machine learning model, the machine learning model being configured to adjust the at least one configurable parameter based on a workload level. The method determining a current workload level at the target database system. The method using the machine learning model for adjusting the at least one configurable parameter according to the determined workload level.

In another aspect, the invention relates to a computer program product comprising a computer-readable storage medium having computer-readable program code embodied therewith, the computer-readable program code configured to implement all of steps of the method according to preceding embodiments.

In another aspect, the invention relates to a computer system for applying changes into a target database system, the computer system being configured for use at least one configurable parameter for applying a requested change in the target database system. The computer system providing a trained machine learning model, the machine learning model being configured to adjust the at least one configurable parameter based on a workload level. The computer system determining a current workload level at the target database system. The computer system using the machine learning model for adjusting the at least one configurable parameter according to the determined workload level.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
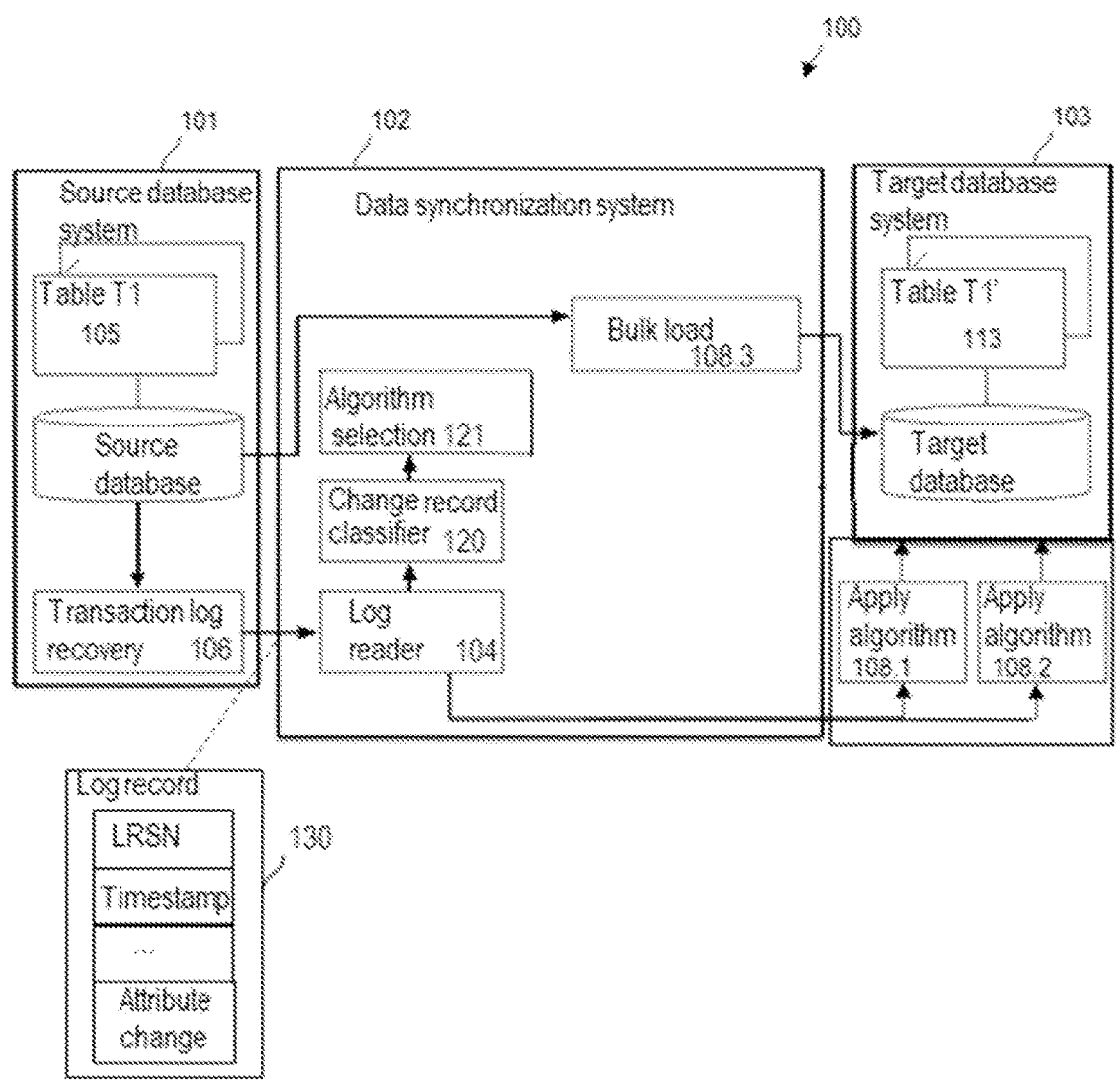
FIG. 1 depicts a data processing system in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The target database system may be part of a data analysis system. The data analysis system comprises in addition to the target database system a source database system. The data analysis system may, for example, be a data warehousing system or master data management system. The data analysis system may enable data warehousing or master data management or another technique that uses a source and target database systems, wherein the target database system comprises a target database that is configured to receive/comprise a copy of a content of a corresponding source database of the source database system. The source database system may be connected to the target database system via a connection. The connection may, for example, be a TCP/IP connection or another connection enabling the communication of data via the connection between the source database system and the target database system. The source database system may, for example, be a transactional engine and the target database system may be an analytical engine. For example, the source database system may be an online transaction processing (OLTP) system and the target database system may be an online analytical processing (OLAP) system. The source database system may comprise a source dataset and the target database system may comprise a target dataset. The source dataset may be part of a source database and the target dataset may be part of a target database. The source and target datasets may be stored in a same or different format. The formats may differ in encryption, compression, row-oriented vs. column-oriented storage, etc. For example, the source dataset may be stored in a row-oriented format and the target dataset may be stored in a column-oriented format. In other terms, the target dataset may be stored by column rather than by row. The content of the source dataset may be changed by one or more database transactions.

The data analysis system may be configured to replicate, using the data synchronization system, changes that occur in a source table of the source database system to the target database system so that said changes may be applied on a target table of the target database system that corresponds to the source table. Applying a change may, for example, comprise inserting one or more records and/or updating one or more records and/or deleting one or more records in one or more tables of the target database system. A data record or record of a table is a collection of related data items such as a name, date of birth and class of a particular user. A record represents an entity, wherein an entity refers to a user, object, or concept about which information is stored in the record. For that, multiple application algorithms (which may also be referred to as update strategies) may be provided, wherein each application algorithm specifies a sequence of replication operations to be performed in order to apply changes to the target database system. For example, each of the application algorithms may use as input a batch of log records of changes to be applied in the database system, wherein the batch of changes may be caused by one or more database transactions and may concern one or more tables of the target database system. Each log record of the log records may represent a change of a record of a table of the target database system. The application algorithms may, for example, comprise an incremental load-based algorithm and a bulk-load based algorithm. The incremental load-based algorithm may, for example, require that each record's change of the batch is applied individually in the target database system. The incremental load-based algorithm may particularly be advantageous for small data sets, because the overhead for large chunks may be high. The bulk load-based application algorithm may, for example, require that the changes are staged into batches. Those batches may then be applied via a bulk load interface to the target database system. The bulk load-based application algorithm may advantageously be used for large data sets. However, the overhead to setup the bulk load may be too high and should not be spent for small-sized chunks that are comprised of just a few rows.

Hence, depending on the change to be applied on the target database system, the application algorithms may have different performances. However, choosing the suitable algorithm accurately and in a systematic way may not be a straightforward action. The present subject matter may solve this issue by providing an optimal and efficient method for dynamically selecting the application algorithm to be used for each change. The method may be efficient in time as it may save additional time that would otherwise be required by a non-adequate application algorithm. The method may be optimal because the decisions may be based on performance behaviours that are accurate and up to date.

Currently, during the initial setup, optimal parameter values may be chosen by engineers based on their expertise of what would work best with the expected workloads. Once set, these values may be kept fixed and may not change over time. This may be problematic since it may lead to inefficient replications when the fixed values do not pair well with the current workload, which may be continuously changing. Customers can experience latencies going up to a few hours or even days when the system is not configured correctly. In this case, analytical queries, routed to the analytics database may result in outdated information. To solve this, the data synchronization system may be configured according to the present subject matter to dynamically adjust the at least one configurable parameter using the machine learning model. The machine learning model may be configured to receive as input a current state of the target database system (which may be referred to as current state of the data analysis system) and to provide, as output, value(s) of the configurable parameter(s). The configurable parameters may be technical parameters that may be adjusted to modify the inner workings of the data analysis system, thus impacting performance. The current state may be defined by at least the current workload level. For that, the current workload level at the target database system may be provided as input to the machine learning model in order to receive as output from the machine learning model a suggestion or prediction of the value(s) of the at least one configurable parameter. The current workload level may be the workload at the target database system in a predefined time period e.g. last hour, during which changes have been applied in the target database system. The workload level may, for example, indicate the workload that the source database system is subject to. This may, for example, be the type, volume and velocity of transactions in time, which can be represented by a combination of metrics and/or statistics describing the set of database operations performed, such as the number of insert, update and delete statements, bytes processed, number of tables changed etc. In one example, the current state of the target database system may further be defined by a current latency level that results from the current workload level. In this case, the current workload level and the associated current latency level may be provided as input to the machine learning model in order to receive as output from the machine learning model a suggestion or prediction of the value(s) of the at least one configurable parameter. In another example, the current workload level may be the workload that is associated with a new requested change/update to be applied in the target database system. The latency or latency level may refer to the difference in time between the arrival of data on the source database system, and the end of replication of the data on the target database system. However, the latency may fluctuate depending on the current state of the system. The present subject matter may enable to maintain latency levels low at all times, ideally achieving close to real-time data synchronization between the source and the target.

The values of the configurable parameters may advantageously be used according to the present subject matter. For example, the data synchronization system may be configured to select one of predefined application algorithms to be used for a received change. For that, the data synchronization system may use the at least one configurable parameter. For example, the configurable parameter may be any one of: a number of records to be inserted, a number of records to be updated, a number of records to be deleted, type of attribute values of the table, and length of the columns of the table. The configurable parameter may indicate the size of the batch that is used as input to the application algorithm. In one example, a distinct at least one configurable parameter may be provided in association with each table of the target database system. This may be advantageous as it may enable optimized processing of tables on individual basis e.g. taking into account the different properties the tables. In another example, the at least one configurable parameter may be associated with all or part of the tables of the target database system. This may save resources that would otherwise be required to process multiple individual configurable parameters. The configurable parameter may have one value or a range of values. The data synchronization system may compare the configurable parameter Θ of a given table with the size of the change to be applied on that given table, and based on the result of the comparison it may select one of the predefined application algorithms. The size of a change of a table may, for example, represent the sizes in bytes of the change to be applied to the table. The size of change may comprise a characteristic of the change and/or a characteristic of the table. The characteristic of the change may comprise at least one of: a number of records to be inserted, a number of records to be updated and a number of records to be deleted. The characteristic of the table may, for example, comprise the number and type of attributes of the table and the length of the columns of the table e.g. the time to execute a single insert may depend on the data types/data type lengths. If, for example, the configurable parameter is defined as the number of records to be inserted, the characteristic of the requested change that corresponds to that definition (i.e. number of records to be inserted) may be compared with the configurable parameter. For example, the application algorithms may comprise a single record apply algorithm and a bulk load apply algorithm. The single record apply algorithm may be suitable for small data sets. This is because the overhead for large chunks may be very high as each record may be processed individually. The bulk apply algorithm may however be suitable for large datasets. Thus, the data synchronization system may use the configurable parameter as a threshold that enables to select one of the single record apply algorithm and the bulk apply algorithm. The data synchronization system may, for example, use the configurable parameter such as the batch size to control the application of the changes.

Hence, the present subject matter may enable to dynamically adjust the configurable parameters. This may take into account changes that currently occur in the target database system. This may be advantageous compared to the case where the configurable parameters are fixed. This may enable to select the best apply implementation in which the replication time may be minimized. Machine learning techniques may be advantageous as they allow to find correlation in the data that otherwise may be difficult to find. For example, several features could influence the value of the configurable parameter Θ, such as the number of columns that each table contains.

The term "machine learning" refers to a computer algorithm used to extract useful information from training data by building probabilistic models (referred to as machine learning models) in an automated way. The machine learning may be performed using one or more learning algorithms such as linear regression, K-means, classification algorithm, reinforcement algorithm etc. A "model" may for example be an equation or set of rules that makes it possible to predict an unmeasured value from other known values and/or to predict or select an action to maximize a future reward or minimize a future penalty.

According to one embodiment, the method further comprises repeatedly performing the determining step and the adjusting step on a time periodic basis e.g. every hour. This may enable to dynamically adjust the configurable parameters and thus improve the replication process based on current states of the system. According to one embodiment, the method further comprises determining using change history event data whether a change related event has occurred in the target database system, in case the change related event occurred, repeating the determining step and the adjusting step. This may save resources that would otherwise be required by performing a systematic update although the system's state did not change.

According to one embodiment, the method further comprises receiving a data change request for applying a change to a table of the target database system, determining a size of the requested change, selecting by the data synchronization system an application algorithm of multiple predefined application algorithms by comparing the determined size with the adjusted configurable parameter, and using the selected application algorithm for applying the requested change.

According to one embodiment, the method further comprises receiving another data change request for applying a change to the table. The method further comprises determining using change history event data whether a change related event has occurred in the target database system. In case the change related event occurred, repeating the determination of the size and the adjustment of the configurable parameter for providing a readjustment of the configurable parameter. The other change may be applied using an algorithm selected based on the readjusted configurable parameter in case the change related event occurred, otherwise the other change may be applied using an algorithm selected based on the previously adjusted parameter. For example, an event monitor may be used to collect information about activities that might impact the performance, behavior, and stability of the target database. The change related event may, for example, comprise a change of configuration parameters of the target database system, occurrence of a commit or rollback operation, DDL execution etc.

According to one embodiment, the method further comprises receiving another data change request for applying a change to the table. In case the other data change request indicates a change in the structure of the table, repeating the determination of the size and the adjustment of the configurable parameter for providing a readjustment of the configurable parameter. The other change may be applied using an algorithm selected based on the readjusted configurable parameter in case the data change request indicates a change in the structure of the table, otherwise the other change may be applied using an algorithm selected based on the previously adjusted parameter. The structure of the table may, for example, be defined by the number of columns and/or number of rows etc.

According to one embodiment, the method further comprises determining a current state of the target database system. The current state is defined by a current workload level and a current latency level of the target database system. The current workload level may be defined by the size of changes previously applied on the target database system e.g. in the last hour. The current state may be input to the machine leaning model for adjusting the configurable parameter. The current state may be the state of the target database system at the time of receiving the data change request.

According to one embodiment, the current workload level comprises a number of records inserted and/or number of records deleted in the target database system and/or one or more characteristics of the tables of the target database system.

According to one embodiment, the data analysis system is configured to compare a value of the at least one configurable parameter with the determined change size, and to select the application algorithm based on the comparison result. Thus, the configurable parameter Θ may be used as a threshold, the adjustment of which may be controlled by the trained machine learning model. For example, in case the at least one configurable parameter comprises multiple configurable parameters, the comparison may be performed between one or more characteristics of the change with the corresponding adjusted configurable parameters. The comparison results may, for example, be combined in order to select the application algorithm based on the combination.

According to one embodiment, the machine learning model is trained using reinforcement learning algorithm, wherein the state space is the representation of the workload level and the current latency level, the action space is an adjustment of the configurable parameter, and the reward function is based on a difference in latency between the previous state and the current state after taking an action. For example, once the machine learning model reaches the threshold of latency defined, a higher success reward may be returned. The machine learning model may be referred to as agent. The training is done through a process of trial and error where the agent takes an action, and receives a feedback signal from the environment quantifying how desirable that decision was. The objective of the agent is to maximize the cumulative reward over the period. The environment may be the data synchronization system and the actions may be the decision of selecting a set of one or more parameter values of the respective configurable parameters to send to the system. Furthermore, the state of the environment can be the current configuration of the workload and latency level. The configuration of the workload may be the workload level. During the training, the agent may communicate e.g. with Db2 accelerator and interact with the environment to learn the optimal policy. This may be achieved by using real replication test cases where the agent periodically adjusts parameter values and receives feedback by means of the reward function. A policy in this case refers to a mapping from the state space onto the action space which the agent relies on to choose his next action given his current state. After training is finished, the agent can be deployed in a running application to optimize latency according to the policy it has learned. The trained agent may be deployed in the application and used to continuously adjust the configurable parameters according to the current state.

The state space may be defined by features representing the workload configuration of the system as well as the current latency level, all of which essentially describes the state of the environment. Specifically, an example state may be a set of four values such as {1000, 200 k, 600 k, 1 M, 50 k}, which correspond to the following features respectively: number of tables changed, number of deleted rows, number of inserted rows, number of bytes processed and latency. The action space may be the configuration parameter values to be set. An example action may be in the form of values {10000, 40000, 14000}, that correspond respectively to: external table threshold value, batch size value and batch timeout value. The reward function may be based on the difference in latency between the previous state and the current state after taking an action. This means, there is either penalise reward of the agent based on whether his action resulted in an increase or decrease in latency observed in the next state. A higher success reward may be given to the agent when he reaches the threshold of latency required (which is a parameter that is specified). This essentially motivates the agent to reach that desired state (of latency below the specified threshold) and remain there. For example, if the current latency is 1000 ms and the agent's action results in a latency value of 1500 ms, then the agent is punished with a value proportional to (1000-1500)=−500.

This embodiment may be advantageous as it may provide a trained machine learning model to act as a controller of the data synchronization system, outputting control actions (e.g. adjustable parameter values) based on the current state (e.g. workload and latency values). The training may be performed at run time using a real configuration of the data analysis system. This approach may have the advantage of being model-free, which means it does not need to make assumptions about the underlying mechanics of the process to model it in order to use said model to make decisions. In other words, it is flexible enough to adapt itself to the non-linearity of the process through experimentation.

According to one embodiment, the reinforcement learning algorithm employs Q-learning or Deep Q-learning. Q-learning may be a simple yet effective algorithm for reinforcement learning tasks. However, its storage requirement may increase exponentially with the size of the state space and action space. An improved version of Q-learning to overcome this limitation may be Deep Q-learning, where instead of storing internal values in a static data structure, a Neural Network may be used as a function approximator to predict them. This means there may be only a need to store the Neural Network's parameters. Using Deep Q-learning may be particularly useful given that the state space is continuous in this case. In order to use Q-learning, the continuous features forming the state space may be discretized in order to have a finite and manageable number of states. Otherwise, one may avoid that stop by using Deep Q-Learning instead, which handles continuous states natively, but may come with an extra cost of computation.

According to one embodiment, the method further comprises employing a safety switch. The safety switch is configured to assess the performance of a data replication using the adjustment suggested by the machine learning model and the performance of the data replication with a default adjustment, comparing the performances, and based on the performance adjusting the data synchronization system.

The determination of the performance with the default adjustment is performed using a second machine learning model. The second machine learning model is configured to receive as input a workload level and to predict the latency associated with the input workload level. The determination of the performance e.g. the latency, with the suggested adjustment may be measured by using the suggested adjustment of the configurable parameters during the run time. The predicted and measured performances may be compared and based on the comparison results one of them may be used.

This embodiment may be advantageous because there may exist situations where the output of the first machine learning model may be a bad choice of parameters prediction that may lead to higher latency compared to a system with the default setting. This embodiment may enable a prevention mechanism that would act as a safety switch mode. For that, a baseline from the system with default/fixed parameters may be used. The second machine learning model may be used as a baseline, which by given workload can predict what would be the resulting latency for a system with fixed/default parameters. By using this prediction, it may be decided if the adjustable configurable parameters may be used or have to switch back to fixed parameters.

According to one embodiment, the performance is defined by any one of: execution time or latency and memory usage. For example, the time required to apply the requested change using default adjustment and the suggested adjustment may be compared, and the adjustment that provides better execution time may be selected.

According to one embodiment, the size of the change comprises: a number of records to be inserted and/or to be deleted, and/or the number of rows and columns of the table.

According to one embodiment, the method further comprises providing a source table associated with the table in a source database system, wherein the source and target database systems are configured to synchronize data between each other; wherein the data change request is received in response to said data change being applied to the source table, thereby replicating the data change.

FIG. 1 is a block diagram of a data processing system (or data analysis system) 100 in accordance with an example of the present subject matter. The data processing system 100 may be configured for data synchronization between a source database system 101 and target database system 103 using data synchronization system 102 in accordance with an example of the present subject matter. The source database system 101 may, for example, be an online transaction processing (OLTP) system. The target database system 103 may, for example, be an online analytical processing (OLAP) system. The communication between the source database system 101 and the target database system 103 may, for example, be performed via a TCP/IP communication layer.

The source database system 101 comprises one or more source tables 105 of a source database and a transaction recovery log 106. Source tables 105 can be relational tables in DB2® for z/OS® (DB2, z/OS, IBM, all IBM-based trademarks and logos, and all are trademarks or registered trademarks of International Business Machines Corporation and/or its affiliates), DB2 for Linux, UNIX, and Windows, and Oracle. The entries or log records of the transaction recovery log 106 describe changes to rows of the source tables 105 at the source database system 101. FIG. 1 shows an example content of a log record 130. The log record 130 may comprise a timestamp, LRSN and attribute changes. More specifically, the log records in the transaction recovery log 106 may, for example, contain information defining (1) the table being changed, (2) the value of the key column in the row being changed, (3) the old and new values of all columns of the changed row, and (4) the transaction (unit of work) causing the change. By definition, an insert is a new data record and therefore has no old values. For delete changes, there is by definition no new data record, only an old data record. Thus, transaction log records for inserted rows may contain only new column values while transaction log records for deleted rows may contain only old column values. Transaction log records for updated rows may contain the new and old values of all row columns. The order of log records in the transaction recovery log may reflect the order of change operations of the transactions and the order of transaction commit records may reflect the order in which transactions are completed. The type of row operations in transaction log records can, for example, be delete, insert or update.

The data synchronization system 102 comprises a log reader 104. Although shown as part of the data synchronization system 102, the log reader 104 may, in another example, be part of the source database system 101. The log reader 104 may read log records of the transaction recovery log 106 and provide them to a change record classifier 120. The change record classifier 120 may classify the log records based on their changes (e.g. to determine the size of the changes) so that a selection module 121 may select one of application algorithms 108.1-108.3 based on the classification of the log records and the update may be performed based on the selected application algorithm. The selection module 121 may be configured to adjust configurable parameters associated with the target tables 113 using a machine learning model as described herein. The values of the adjusted configurable parameters may be used as described herein to select the appropriate application algorithm. In one example, the selection module 121 may use a safety switch as described with reference to FIG. 8 to compare the performance of the target database system when applying a requested change with the adjustment suggested by the machine learning model and the performance of the application of the requested change with a default adjustment, and based on the comparison result one of the default and suggested adjustments may be used. The application algorithm selection and the change application using said application algorithm may, for example, be performed automatically as soon as a pre-defined amount of log records (e.g. 1000 log records) is saved in the transaction recovery log 106 e.g. that amount of log records may be used to define a new change request. In each iteration, only the newly added log records with respect to the previous provided log records may be processed. The selected application algorithm may, for example, comprise a bulk-load based update strategy 108.3 or one or more incremental update strategies 108.1-108.2. The synchronization may be performed differently for the bulk-load based update strategy and the incremental update strategy.

The log reader 104 may be configured to perform a log shipping of the transaction recovery log 106 to the target database system 103 based on an incremental update strategy that is selected by the selection module 121. The shipping may, for example, be performed by sending a stream of log records formed from log records of the transaction recovery log 106. The log stream being shipped may, for example, be associated with as stream ID. The stream of log records may, for example, be a stream of merged log records. This may enable an efficient processing of the log records at the target database system. The target database system 103 may comprise multiple apply programs 108.1 and 108.2 each being associated with a respective incremental update strategy. FIG. 1 shows only three apply algorithms for exemplification purpose but it is not limited to. The target database system 103 further comprises one or more target table copies 113. The target database system comprises a log streaming interface for receiving the log streams from the source database system 101. Each of the apply programs 108.1 and 108.2 may be configured to receive streams of log records via the log streaming interface. Each of the apply programs 108.1 and 108.2 may buffer the received log records and consolidate the changes into batches to improve efficiency when applying the modifications to the tables 113 of the target database e.g. via a bulk-load interface.

In another example, a bulk load (snapshot updates) algorithm 108.3 may be performed between the source database system 101 and the target database system 103 based on a selected bulk-based update strategy. The load may be a load of entire table data or of a set of partitions of a table at a given point in time and directly performed from the source database system to the target database system. Data on the target database system may reflect the source database system state at the time the load was executed.

Although shown as separate components, the data synchronization system 102 may, in another example, be part of the source database system 101 or be part of the target database system 103. In one example, the source and target database systems 101 and 103 may be on the same system or on different systems in a distributed network.

Figure 2:
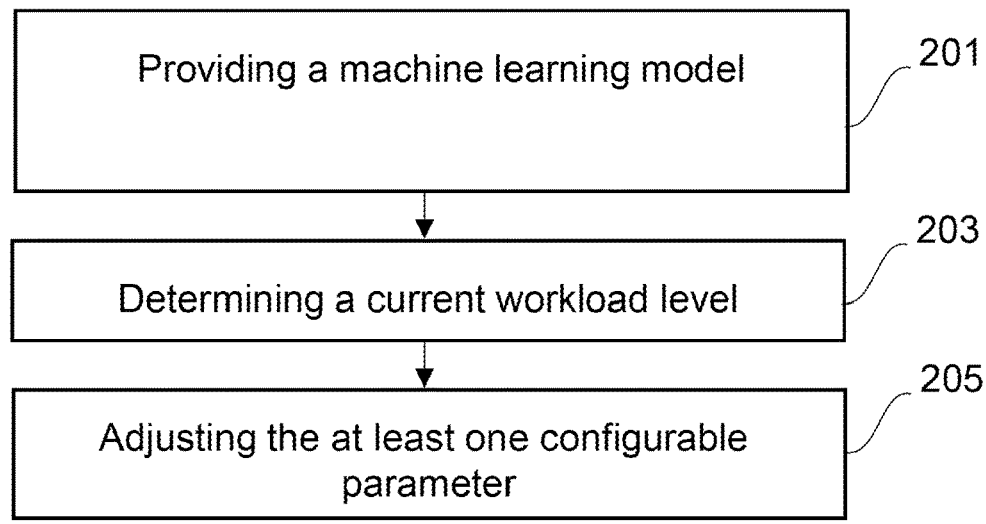
FIG. 2 is a flowchart of a method for applying changes in a target database system in accordance with an example of the present subject matter.

FIG. 2 is a flowchart of controlling a data synchronization system in accordance with an example of the present subject matter. For the purpose of explanation, the method described in FIG. 2 may be implemented in the system illustrated in FIG. 1, but is not limited to this implementation. The method of FIG. 2 may, for example, be performed by the data synchronization system 102.

The data synchronization system 102 is configured to apply requested changes in the target database system 103 based on current values of the configurable parameters. The present method may enable to set the values of the configurable parameters dynamically. The configurable parameters may comprise an apply strategy parameter. For example, there may be two different strategies to apply data to the target database. The first one may be the single record apply algorithm and the second one may be a bulk apply algorithm. The apply strategy parameter may be used as a threshold (e.g. named external table threshold) so that if the number of modified records is less than this threshold, then data may be modified using the single record apply strategy, otherwise the bulk apply strategy may be used. In another example, the configurable parameters may comprise a batch parameter. For example, transaction changes may be batched before being committed. In this case, there may be two strategies involved in the batching process: size based strategy, where transaction work items are collected in the current batch until a certain amount of data (e.g. 50 Mb) is reached. This is represented by the batch size parameter. Another example apply strategy is time based, where transaction work items are collected in the current batch until a certain amount of time (e.g. 7 sec) has passed. This is represented by the batch timeout parameter. The batch parameter may be the batch size parameter or batch timeout parameter.

A trained machine learning model may be provided in step 201. The machine learning model is configured to adjust the configurable parameters based on a workload level. The machine learning model may be configured to receive as input a current state e.g. of the target database system and to provide, as output, value(s) of the configurable parameters.

A current workload level at the target database system may be determined in step 203. The machine learning model may be used in step 205 for adjusting the at least one configurable parameter according to the determined workload level. The values of the configurable parameters may, for example, be set in the data analysis system through an interface. The adjusted values may automatically be used by the data analysis system in order to apply changes e.g. apply changes that are received immediately after the configurable parameters are adjusted.

In case the machine learning model is trained using a supervised machine learning algorithm, the machine learning model may use as input the current workload level in order to predict the value of the at least one configurable parameter. The current workload level may be defined in this case as being the workload level that is going to be applied or executed by the target database system e.g. the current workload level may be the workload associated with a received replication request for changing data in the target database system.

In case the machine learning model is trained using a reinforcement learning algorithm, the machine learning model may use as input a current state that is defined by the current workload level and the associated latency level. For example, the machine learning model may retrieve the current latency and associated workload configuration (which form the current state of the environment). In this case, the current workload level may be the workload at the target database system in a predefined time period e.g. last hour, during which changes have been applied in the target database system. Based on this state, the machine learning model may, for example, select values for the adjustable configurable parameters.

The process of steps 203 and 205 may keep repeating as long as the data analysis system is running. For example, during the online phase of the data analysis system 100, time may be discretised into time-steps of T seconds. After each time-step, the current workload level may be determined and the at least one configurable parameter may be adjusted accordingly using the machine learning model.

Figure 3:
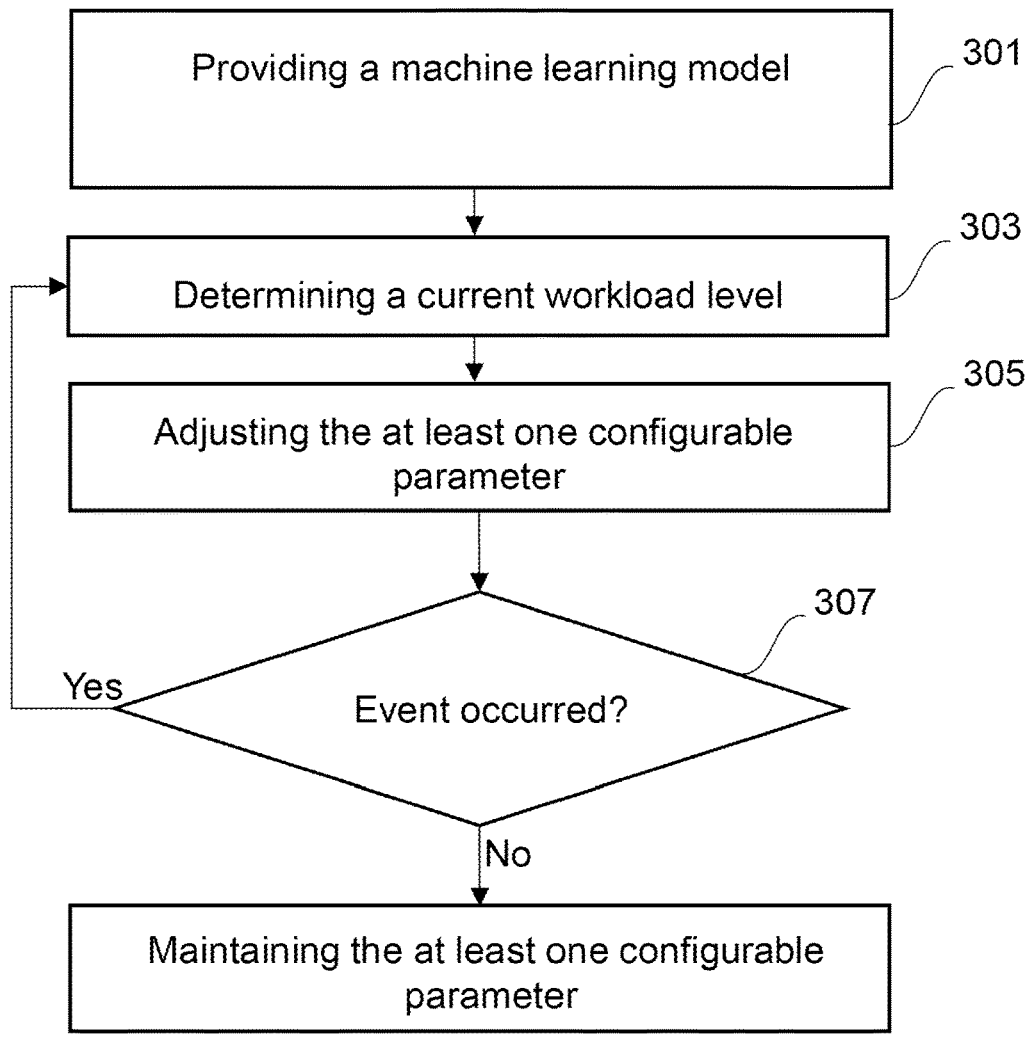
FIG. 3 is a flowchart of a method for applying changes in a target database system in accordance with an example of the present subject matter.

FIG. 3 is a flowchart of controlling a data synchronization system in accordance with an example of the present subject matter. For the purpose of explanation, the method described in FIG. 3 may be implemented in the system illustrated in FIG. 1, but is not limited to this implementation. The method of FIG. 3 may, for example, be performed by the data synchronization system 102.

The method of FIG. 3 comprises steps 301 to 305. Steps 301 to 305 are steps 201 to 205 of FIG. 2 respectively. The method further comprises the step 307 of checking whether an event occurred. For example, it may be determined in step 307 using change history event data whether a change related event has occurred in the target database system. For example, an event monitor may be used to collect information about activities that might impact the performance, behaviour, and stability of the target database. The change related event may, for example, comprise a change of parameters of the target database system, occurrence of a commit or rollback operation, DDL execution etc. In case the change related event occurred, steps 303 to 307 may be repeated; otherwise the previous last values of the at least one configurable parameter may be maintained.

Figure 4:
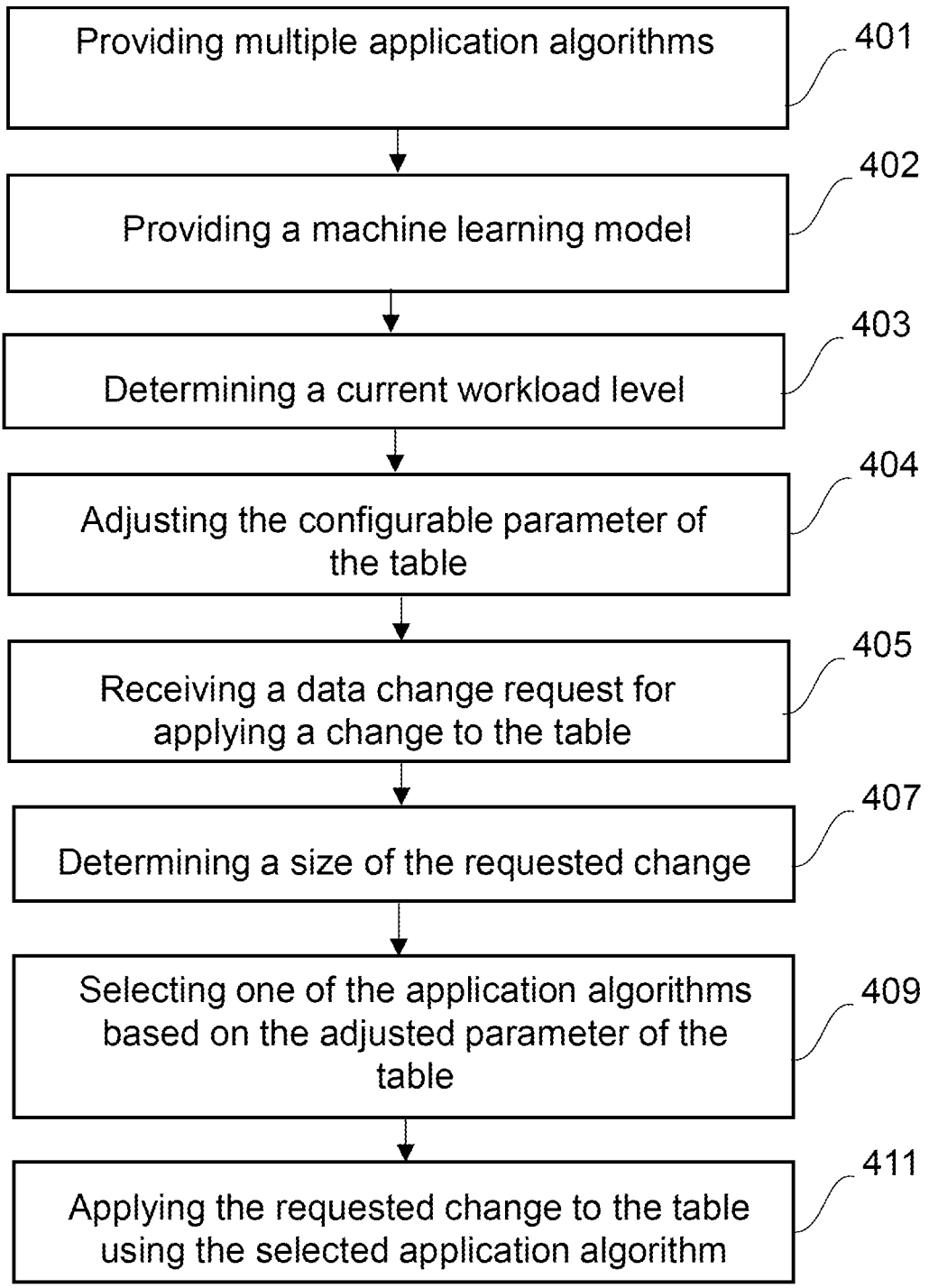
FIG. 4 is a flowchart of a method for applying changes in a target database system in accordance with an example of the present subject matter.

FIG. 4 is a flowchart of a method for applying changes into a table $T_g$ of a target database system according to an example of the present subject matter. For the purpose of explanation, the method described in FIG. 4 may be implemented in the system illustrated in FIG. 1, but is not limited to this implementation. The method of FIG. 4 may, for example, be performed by the data synchronization system 102. The method of FIG. 4 may, for example, enable to apply changes made in a source table $T_s$ (that corresponds to $T_g$) of a source database system to the target database system and thus may enable synchronization between the source and target database systems.

Multiple application algorithms may be provided in step 401 for applying changes in the target database system. For example, a number r of application algorithms $App_1, \ldots App_r$, where $r \geq 2$ may be provided. Each of the application algorithms may apply changes in different ways, resulting effectively in different application algorithms. For example, the single record apply algorithm may update only data changed since the last update of the table $T_g$ or may update the whole table $T_g$ whenever a change is occurred at the corresponding source table $T_s$. This may provide two different single record apply algorithms. For example, the provided application algorithms may comprise two algorithms, a single record apply algorithm that applies each change record individually and a bulk apply algorithm that applies change records in batch.

A trained machine learning model may be provided in step 402. The machine learning model is configured to receive as input a current state of the target database system and to adjust the configurable parameter of a table based on the state. The state of the target database system is a state related to the table. For example, the state may comprise workload level associated with that table such as a number of records inserted in the table, a number of records updated in the table, a number of records deleted from the table, the type of attribute values of the table, and the length of the columns of the table. In addition, the state may further indicate the latency level of the target database system associated with workload level. This may particularly be advantageous in case the machine learning model is trained using reinforcement algorithms because the latency level may enable to compute the reward function. The latency level may be determined specifically for the requested table. For example, a heuristic may be applied to break down latency and account it to a particular table. For example, a counter of changes may be maintained per table in the target database system and the share of those changes may be calculated on the overall changes to estimate the latency associated with a given table.

The current workload level associated with the table $T_g$ may be determined in step 403. In addition, the latency level associated with the table $T_g$ may be defined in case of a reinforcement learning of the model, because the reward function may be computed using the latency level. The current state may be defined by the determined workload level. The current state may further be defined by the latency level. The determined workload level may be used in step 404 to adjust the configurable parameter by the trained machine learning model according to the workload level. Using the current state, the machine learning model may change the value of the configurable parameter to a value that is suitable for the current state. In case of a reinforcement learning, the trained machine learning model may, for example, use its trained Q-table (e.g. as obtained with the method of FIG. 5) to find that value of the configurable parameter.

A data change request (or replication request) may be received in step 405 for applying a change to the table $T_g$. For example, in response to detecting a change in the source table $T_s$ the data change request may be sent to the data synchronization system 102. Step 405 may be performed after step 404. This may be advantageous as it may enable to adjust the configurable parameter independently of received requests. In another example, step 405 may be performed before steps 403 and 404. This may be advantageous as it may enable to dynamically adjust the configurable parameter of the table $T_g$ in response to receiving a change request of the table $T_g$.

In response to receiving the data change request, the size of the requested change may be determined in step 407. The definition of the size may be the same used for the definition of the configurable parameter of the table $T_g$. For example, the size $s_t$ of the requested data change may be a number of records to be inserted in the table $T_g$, a number of records to be updated in the table $T_g$, a number of records to be deleted from the table $T_g$, the type of attribute values of the table $T_g$, or the length of the columns of the table $T_g$. The size of the data change may thus represent the sizes in bytes of the changes to be applied per table.

The data synchronization system may then select in step 409 the application algorithm to be used based on the adjusted configurable parameter. For example, depending on the value of the configurable parameter Θ of the table $T_g$, one of the two algorithms: the single record apply algorithm and bulk apply algorithm, may be chosen. The configurable parameter may be used as a threshold e.g. indicating a number of inserts and/or deletes. The size of the change to be applied may be compared against the threshold in order to choose one of the two algorithms.

The requested change may be applied in step 411 to the table $T_g$ using the selected application algorithm. For example, the selected application algorithm may use log records associated with the requested change in order to apply the change. The method steps 407 to 411 may be repeated for further received change requests for the table $T_g$.

The method steps 407 to 411 may be repeated for a received change request involving another table $T'_g$. In this case, the selection of the application algorithm may be performed based on the adjusted configurable parameter associated with the table $T'_g$.

Figure 5:
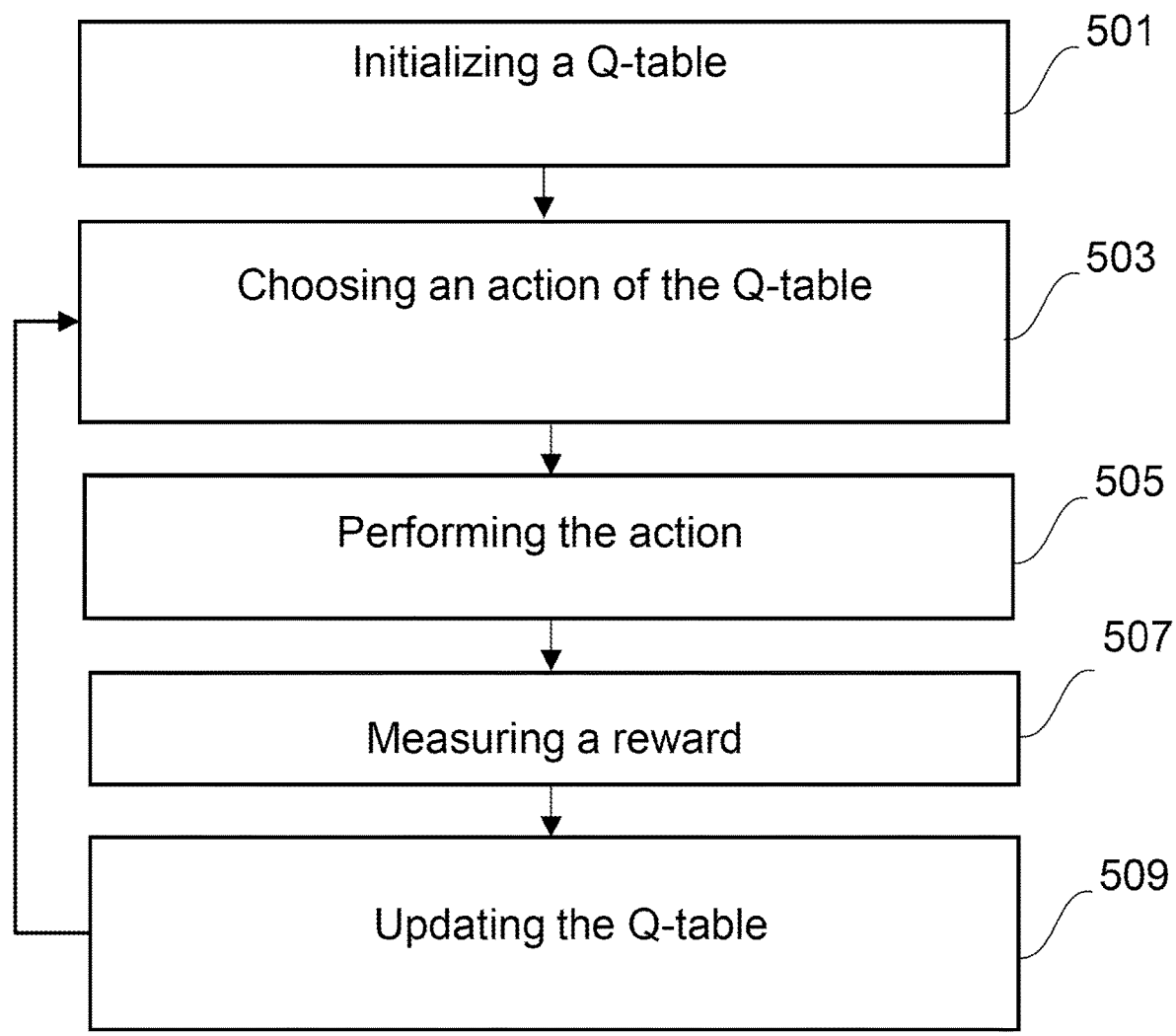
FIG. 5 is a flowchart of a method for training a machine learning model in accordance with an example of the present subject matter.

FIG. 5 is a flowchart of a method for training the machine learning model using Q-learning.

In reinforcement learning task, the training may be done through a process of trial and error where an agent takes an action, and receives a reward or a punishment signal from the environment. The objective of the agent is to maximise the cumulative reward over the time period. Therefore, before building a reinforcement learning model, a state space, an action space and a reward function may need to be specified. In this case, the state space is the representation of the workload level and the current latency level. The action space is the threshold value Θ to be chosen or changed. The reward function is based on the difference in latency between the previous state and the current state after taking an action. Once the agent reaches the threshold of defined latency, a higher success reward will be returned.

Q-learning may be advantageous as it provides a simple but effective algorithm for implementing reinforcement learning tasks. For that, a table named Q-table may be provided, wherein the rows of the Q-table are the states and the columns of the Q-table are the actions it can take.

The Q-table may be initialized to be all zeros in step 501. An action may be chosen in step 503 and may be performed in step 505. Then the reward may be obtained for the action in step 507. The Q-table is then updated in step 509 using the bellman equation: $Q(s, \alpha) = r + \gamma(\max(Q(s', \alpha')))$, where s represents the current state, α represents the action the agent takes from the current states. s' represents the state resulting from the action α in state s. r is the reward the agent gets for the action and γ is the discount factor. The max operator is defined over the a' variable in order to find the value of a' that maximizes $Q(s', \alpha')$ where s' is fixed in the equation $Q(s, \alpha) = r + \gamma(\max(Q(s', \alpha')))$. Therefore, the Q value for the state s taking the action α is the sum of the instant reward and the discounted future reward. As indicated in FIG. 5, the agent will continuously update Q-table for every iteration until the goal state is reached. The optimal value of the configurable parameter Θ can be dynamically modified by following the trained Q-table.

Figure 6:
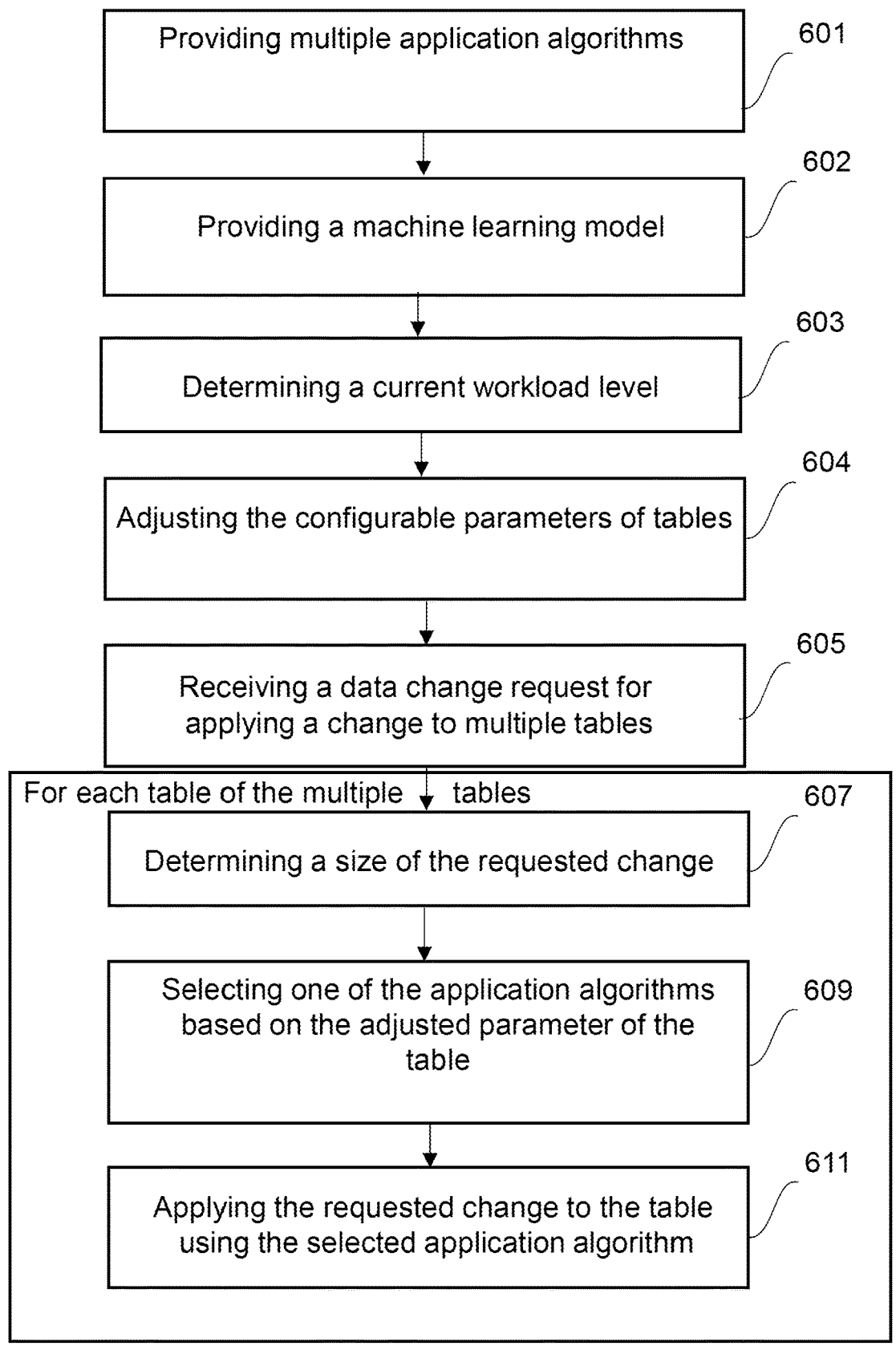
FIG. 6 is a flowchart of a method for applying changes in a target database system in accordance with an example of the present subject matter.

FIG. 6 is a flowchart of a method for applying changes into multiple tables of a target database system according to an example of the present subject matter. For simplification of the description only two tables may be considered, $T_{g1}$ and $T_{g2}$; however, it is not limited to two tables. For the purpose of explanation, the method described in FIG. 6 may be implemented in the system illustrated in FIG. 1, but is not limited to this implementation. The method of FIG. 6 may, for example, be performed by the data synchronization system 102. The method of FIG. 6 may, for example, enable to apply changes made in source tables $T_{s1}$ and $T_{s2}$ (that correspond to the multiple tables $T_{g1}$ and $T_{g2}$) of a source database system to the target database system and thus may enable synchronization between the source and target database systems.

Multiple application algorithms may be provided in step 601 (e.g. as described with reference to step 401 of FIG. 4) for applying changes in the target database system. A trained machine learning model may be provided in step 602 as described with reference to FIG. 4. The current workload level associated with each of the two tables $T_{g1}$ and $T_{g2}$ may be determined in step 603. This may enable to determine a current state of the target database system in relation with the two tables. For example, the first current state associated with the table $T_{g1}$ may be defined by the workload level of the table $T_{g1}$, and the second current state associated with the table $T_{g2}$ may be defined by the workload level of the table $T_{g2}$. In case the machine learning model is trained using a reinforcement algorithm, each of the first state and second state may further include or be defined by a first latency level associated with the table $T_{g1}$ and a second latency level associated with the table $T_{g2}$ respectively. The first state may be given as input to the trained machine learning model in order to adjust in step 604 the configurable parameter Θ1 of the table $T_{g1}$. The second state may be given as input to the trained machine learning model in order to adjust in step 604 the configurable parameter Θ2 of the table $T_{g2}$.

A data change request may be received in step 605 for applying changes to the tables $T_{g1}$ and $T_{g2}$. In response to receiving the data change request steps 607 to 611 may be performed for each of the two tables $T_{g1}$ and $T_{g2}$. For example, the size of the change associated with each of the tables $T_{g1}$ and $T_{g2}$ may be determined. One of the application algorithms may be selected for the table $T_{g1}$ based on the configurable parameter Θ1. For example, the size of the requested change of the table $T_{g1}$ may be compared with the configurable parameter Θ1 in order to select the algorithm. Similarly, one of the application algorithms may be selected for the table $T_{g2}$ based on the configurable parameter Θ2. For example, the size of the requested change of the table $T_{g2}$ may be compared with the configurable parameter Θ2 in order to select the algorithm. The requested changes may be applied on the two tables $T_{g1}$ and $T_{g2}$ using the respective selected application algorithms.

In another example, steps 603 and 604 may be performed in response to receiving the request of step 605.

Figure 7:
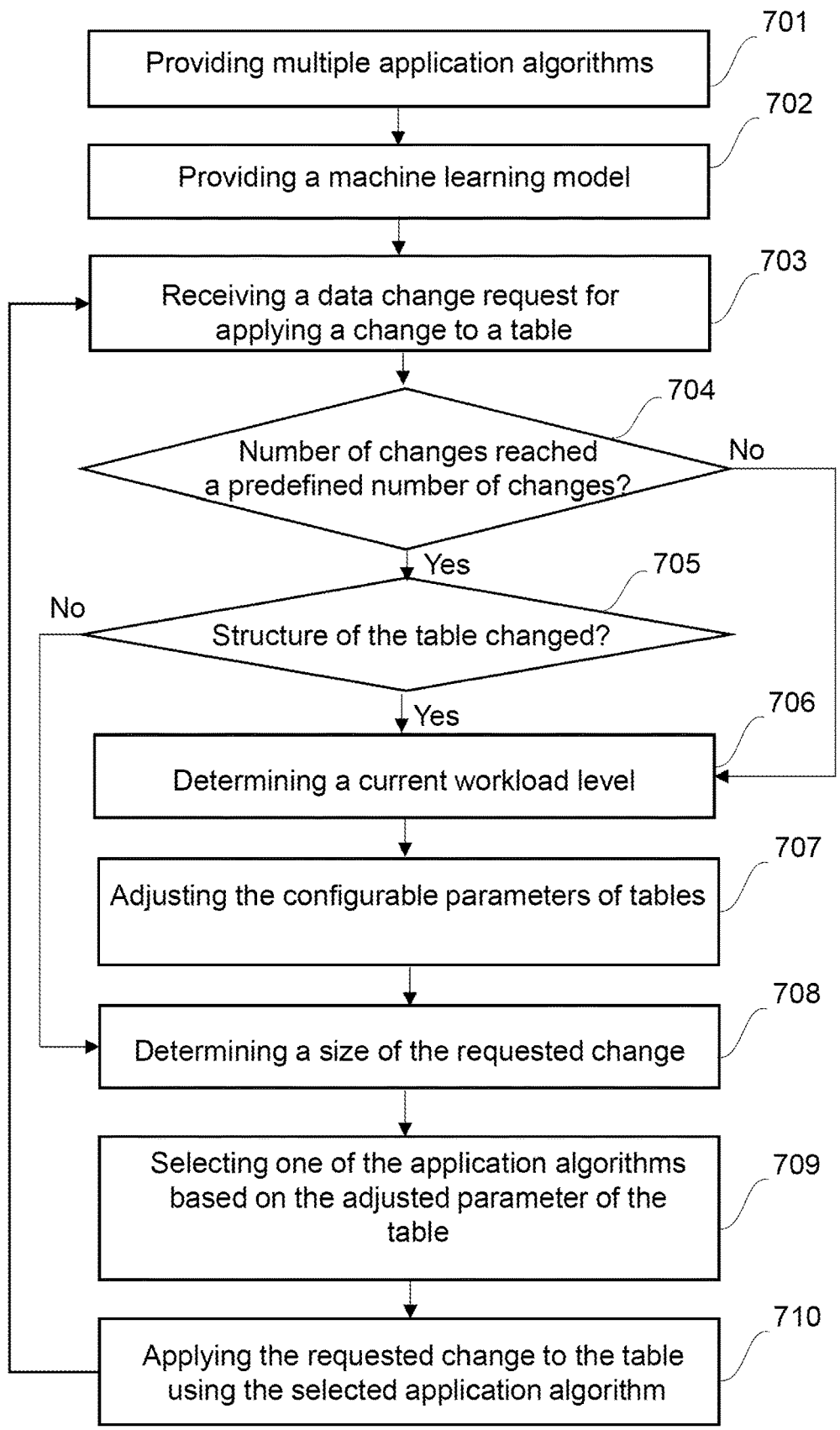
FIG. 7 is a flowchart of a method for applying changes in a target database system in accordance with an example of the present subject matter.

FIG. 7 is a flowchart of a method for applying changes into a table $T_g$ of a target database system according to an example of the present subject matter. For the purpose of explanation, the method described in FIG. 7 may be implemented in the system illustrated in FIG. 1, but is not limited to this implementation. The method of FIG. 7 may, for example, be performed by the data synchronization system 102. The method of FIG. 7 may, for example, enable to apply changes made in a source table $T_s$ (that corresponds to $T_g$) of a source database system to the target database system and thus may enable synchronization between the source and target database systems.

Steps 701, 702 and 703 are steps 401, 402 and 405 of FIG. 4 respectively. In step 704 it may be determined if the number of changes (including the requested change of step 703) that are received for the table $T_g$ has reached a predefined number K of changes. In one example, the value of K may be fixed e.g. K=2 or K>2. In another example, the value of K may dynamically be changed e.g. after the condition of step 703 is fulfilled the value of K may be changed e.g. shifted by a given value. In case the number of changes has not reached the predefined number K, steps 706 to 710 may be performed. In case the number of received changes for the table $T_g$ has reached the predefined number K, it may be determined in step 705 if the structure of the table $T_g$ has changed in the received request of step 703. In case the table structure has changed steps 706 to 710 may be performed, otherwise steps 708 to 710. In case the table structure did not change, the previous last value of the configurable parameter of the table $T_g$ may be used in step 709. Steps 706, 707, 708, 709 and 710 are steps 403, 404, 407, 409 and 411 of FIG. 4 respectively. Steps 703 to 710 may be repeated for each further received change request of the table $T_g$.

Figure 8:
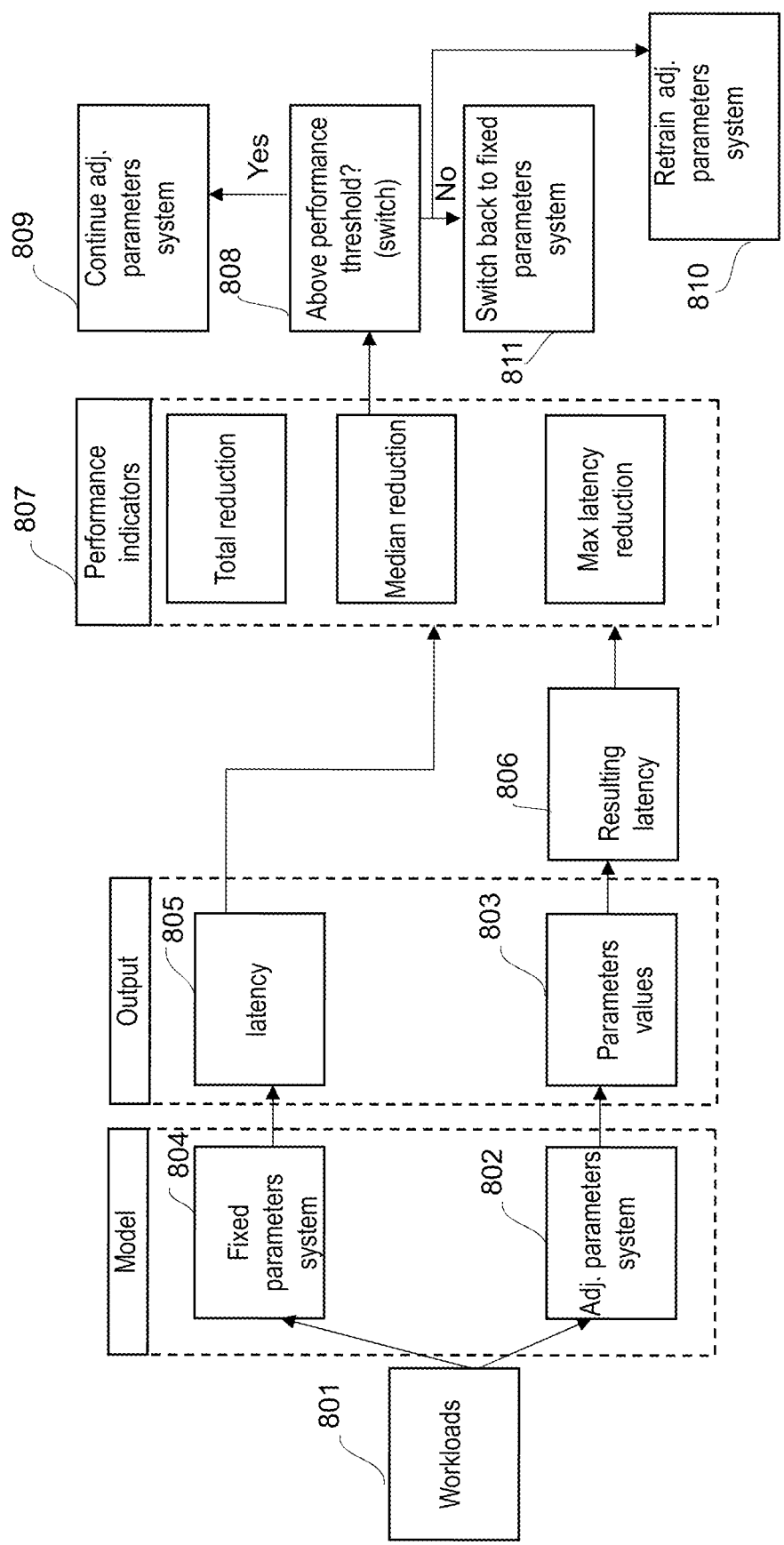
FIG. 8 is a diagram illustrating a method for adjusting configurable parameters according to an example of the present subject matter.

FIG. 8 is a diagram illustrating a method for adjusting configurable parameters according to an example of the present subject matter.

Two trained machine learning models ML1 and ML2 may be provided. The machine learning model ML1 may be trained using a reinforcement learning algorithm. The machine learning model ML1 may be configured to receive as input a workload level 801 and associated latency level. Based on the input, the machine learning model ML1 may set values 803 to the configurable parameters 802. The machine learning model ML2 may be trained on a system with fixed values 804 of the configurable parameters 802. The fixed values 804 may be used as the default setting. The machine learning model ML2 may take workload as input data and corresponding latency as target, and trained by using a machine learning regression algorithm to predict latency given a specific workload. As indicated in FIG. 8, the machine learning model ML2 may receive as input the workload level 801 and may provide a prediction of the latency 805. The latency level 806 of workloads executed using the new parameter values 803 may, for example, be measured. The two latency levels 806 and 805 may be compared (step 808) using performance indicators 807. For example, three different kinds of metrics may be used as indicators, namely, average latency, median latency and maximum latency. Each of the three metrics may be associated with a threshold value, first, second and third threshold values. The three metrics may be associated with a first flag, a second flag and a third flag respectively. If the difference between the latency level 805 and the latency level 806 (i.e. Latency(ML1)−Latency(ML2)) is higher than one threshold value of the three threshold values, this indicates that the machine learning model ML1 is outputting a worse parameter prediction than ML2, then the flag associated with that metric may be set (in step 808) to one, otherwise the flag may be set to zero. The flag values may be stored in a list. Thus, the comparison of the latency level 805 and the latency level 806 may result in three set flags in the list. If two or more flags of the three flags are set to one, the configurable parameter settings may be switched (step 809) to the values of the configurable parameters 803 and may be maintained for a time period P. During the time period P, the machine learning model ML1 may be fine-tuned and/or retrained (step 810). After the time period P, a switch back (step 811) to the default setting may be performed. Then the method may go back to step 808, in order to repeat the comparisons and the switching to one of the values of the configurable parameters based on new comparison results. Thus, the method of FIG. 8 may enable to turn into switch mode of configurable parameters when the latency is not improved in a period of time.

Figure 9:
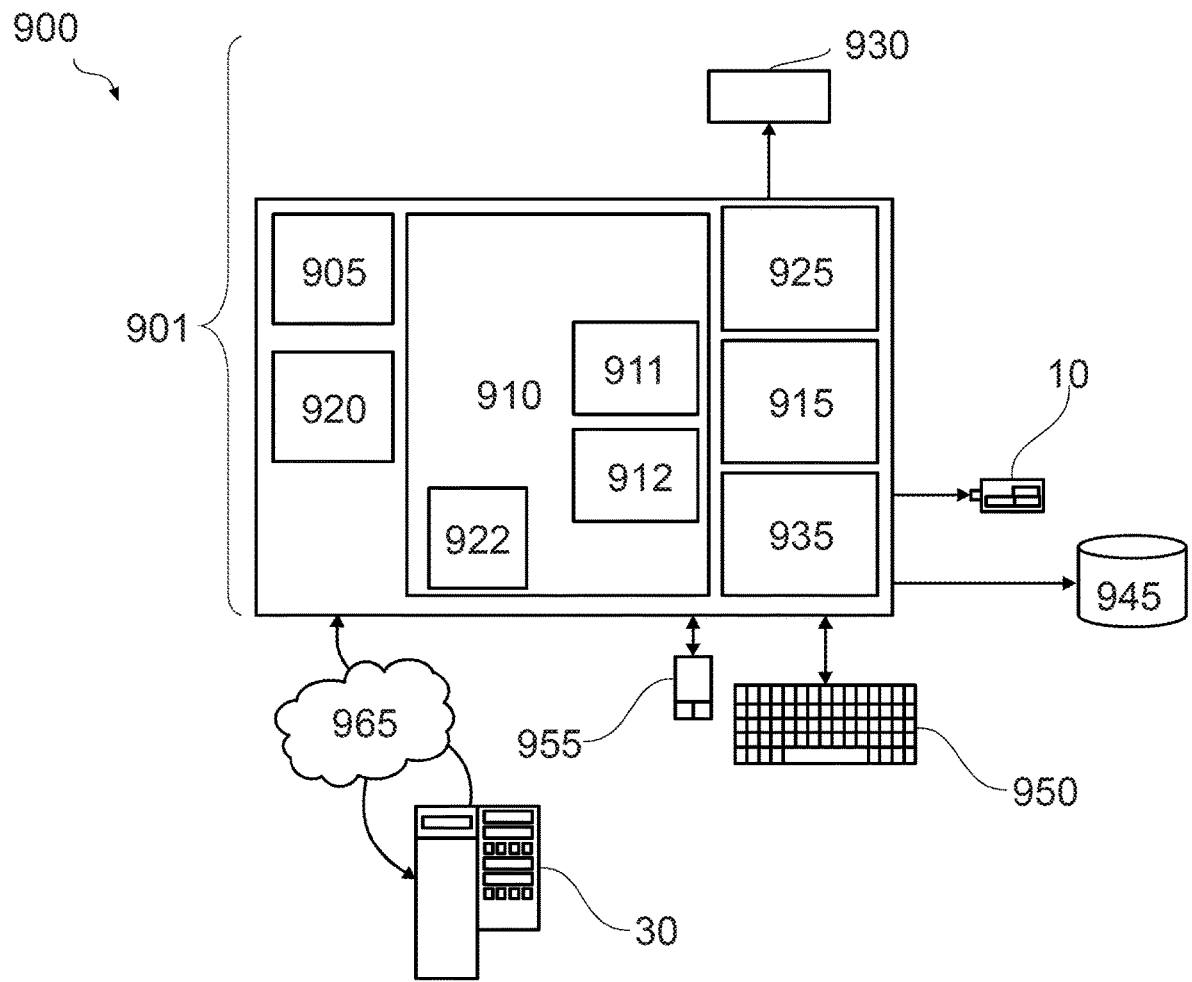
FIG. 9 represents a computerized system, suited for implementing one or more method steps as involved in the present disclosure.

FIG. 9 represents a general computerized system 900 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 912, 922 (including firmware 922), hardware (processor) 905, or a combination thereof. In exemplary embodiments, the methods described herein are implemented in software, as an executable program, and is executed by a special or general-purpose digital computer, such as a personal computer, workstation, minicomputer, or mainframe computer. The most general system 900 therefore includes a general-purpose computer 901.

In exemplary embodiments, in terms of hardware architecture, as shown in FIG. 9, the computer 901 includes a processor 905, memory (main memory) 910 coupled to a memory controller 915, and one or more input and/or output (I/O) devices (or peripherals) 10, 945 that are communicatively coupled via a local input/output controller 935. The input/output controller 935 can be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 945 may generally include any generalized cryptographic card or smart card known in the art.

The processor 905 is a hardware device for executing software, particularly that stored in memory 910. The processor 905 can be any custom made or commercially available processor, a central processing unit (CPU), an auxiliary processor among several processors associated with the computer 901, a semiconductor-based microprocessor (in the form of a microchip or chip set), or generally any device for executing software instructions.

The memory 910 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 910 can have a distributed architecture, where various components are situated remote from one another, but can be accessed by the processor 905.

The software in memory 910 may include one or more separate programs, each of which comprises an ordered listing of executable instructions for implementing logical functions, notably functions involved in embodiments of this invention. In the example of FIG. 9, software in the memory 910 includes instructions 912 e.g. instructions to manage databases such as a database management system.

The software in memory 910 shall also typically include a suitable operating system (OS) 911. The OS 911 essentially controls the execution of other computer programs, such as possibly software 912 for implementing methods as described herein.

The methods described herein may be in the form of a source program 912, executable program 912 (object code), script, or any other entity comprising a set of instructions 912 to be performed. When a source program, then the program needs to be translated via a compiler, assembler, interpreter, or the like, which may or may not be included within the memory 910, so as to operate properly in connection with the OS 911. Furthermore, the methods can be written as an object-oriented programming language, which has classes of data and methods, or a procedure programming language, which has routines, subroutines, and/or functions.

In exemplary embodiments, a conventional keyboard 950 and mouse 955 can be coupled to the input/output controller 935. Other output devices such as the I/O devices 945 may include input devices, for example but not limited to a printer, a scanner, microphone, and the like. Finally, the I/O devices 10, 945 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 945 can be any generalized cryptographic card or smart card known in the art. The system 900 can further include a display controller 925 coupled to a display 930. In exemplary embodiments, the system 900 can further include a network interface for coupling to a network 965. The network 965 can be an IP-based network for communication between the computer 901 and any external server, client and the like via a broadband connection. The network 965 transmits and receives data between the computer 901 and external systems 30, which can be involved to perform part, or all of the steps of the methods discussed herein. In exemplary embodiments, network 965 can be a managed IP network administered by a service provider. The network 965 may be implemented in a wireless fashion, e.g., using wireless protocols and technologies, such as WiFi, WiMax, etc. The network 965 can also be a packet-switched network such as a local area network, wide area network, metropolitan area network, Internet network, or other similar type of network environment. The network 965 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 901 is a PC, workstation, intelligent device or the like, the software in the memory 910 may further include a basic input output system (BIOS) 922. The BIOS is a set of essential software routines that initialize and test hardware at startup, start the OS 911, and support the transfer of data among the hardware devices. The BIOS is stored in ROM so that the BIOS can be executed when the computer 901 is activated.

When the computer 901 is in operation, the processor 905 is configured to execute software 912 stored within the memory 910, to communicate data to and from the memory 910, and to generally control operations of the computer 901 pursuant to the software. The methods described herein and the OS 911, in whole or in part, but typically the latter, are read by the processor 905, possibly buffered within the processor 905, and then executed.

When the systems and methods described herein are implemented in software 912, as is shown in FIG. 9, the methods can be stored on any computer readable medium, such as storage 920, for use by or in connection with any computer related system or method. The storage 920 may comprise a disk storage such as HDD storage.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for applying changes into tables of a target database system using a data synchronization system, the data synchronization system being configured to automatically use at least one configurable parameter for applying a requested change in the target database system, the method comprising:

providing a machine learning model, the machine learning model being configured to adjust the at least one configurable parameter based on a workload level, wherein the machine learning model employs Q-learning algorithm with a Q-table, wherein the Q-table is updated using bellman equation;

determining a current workload level at the target database system;

using the machine learning model for adjusting the at least one configurable parameter according to the determined workload level;

determining a current state of the target database system, wherein the current state of the target database system is selected from a group consisting of number of records inserted in a table, number of records updated in the table, number of records deleted from the table, type of attribute values of the table, and length of columns of the table;

inputting the current state to the machine leaning model for adjusting the configurable parameter;

receiving a data change request for applying a change to the table of the target database system;

determining a size of the requested change;

selecting by the data synchronization system an application algorithm of multiple predefined application algorithms by comparing the determined size with the adjusted configurable parameter;

applying the requested change using the selected application algorithm;

receiving another data change request for applying a change to the table;

determining using change history event data whether a change related event has occurred in the target database system;

based on determining the change related event occurred, repeating for the other change the determination of the size and the adjustment of the configurable parameter for providing a readjustment of the configurable parameter; and applying the other change using the readjusted configurable parameter in case the change related event occurred, otherwise applying the other change using the previously adjusted configurable parameter.

2. The method of claim 1, further comprising:
repeatedly performing the determining step and the adjusting step on a time periodic basis.

3. The method of claim 1, further comprising:
determining using change history event data whether a change related event has occurred in the target database system; and
based on determining the change related event occurred, repeating the determining step and the adjusting step.

4. The method of claim 1, further comprising:
receiving another data change request for applying a change to the table;
based on determining the other data change request indicates a change in the structure of the table, repeating for the other change the determination of the size and the adjustment of the configurable parameter for providing a readjustment of the configurable parameter;
applying the other change using the readjusted configurable parameter based on determining the data change request indicates a change in the structure of the table; and
based on determining the data change request does not indicate the change in the structure of the table, applying the other change using previously adjusted configurable parameter.

5. The method of claim 1, wherein each table of the target database system is associated with a respective configurable parameter, wherein the machine learning model is configured for adjusting the configurable parameter of each table.

6. The method of claim 1, further comprising:
determining the current state of the target database system, wherein the current state being further defined by the current workload level and associated current latency level; and
inputting the current state to the machine leaning model for adjusting the configurable parameter.

7. The method of claim 1, wherein the workload level is defined by at least one of: a number of records inserted in the table, a number of records updated in the table, a number of records deleted from the table, type of attribute values of the table, and length of the columns of the table.

8. The method of claim 1, wherein the machine learning model is trained using reinforcement learning algorithm, wherein a state space is the representation of the current workload level and a current latency level, wherein an action space is an adjustment of the configurable parameter, and wherein a reward function is based on a difference in latency between the previous state and the current state after taking an action.

9. The method of claim 1, further comprising:
employing a safety switch, wherein the safety switch being configured to:
assess the performance of data replication into the target database system using the adjustment suggested by the machine learning model and the performance of data replication into the target database system using a default adjustment of the configurable parameter;
compare the performances to determine a comparison result; and
based on the comparison result above a threshold, using the default adjustment of the configurable parameter.

10. The method of claim 9, wherein the determination of the performance with the default adjustment is performed using a second machine learning model, wherein the second machine learning model being configured to receive as input a workload level and to predict the performance associated with the input workload level.

11. The method of claim 9, wherein the performance is defined by any one of:
execution time and memory usage.

12. The method of claim 1, further comprising:
providing a source table associated with the table in a source database system, wherein the source and target database systems are configured to synchronize data between each other; and
replicating the data change, wherein the data change request is received in response to said data change being applied to the source table.

13. A computer program product comprising:
a computer-readable storage medium having computer-readable program code embodied therewith, the computer-readable program code configured to implement the method comprising:
providing a machine learning model, the machine learning model being configured to adjust the at least one configurable parameter based on a workload level, wherein the machine learning model employs Q-learning algorithm with a Q-table, wherein the Q-table is updated using bellman equation;
determining a current workload level at the target database system;

using the machine learning model for adjusting the at least one configurable parameter according to the determined workload level;
determining a current state of the target database system, wherein the current state of the target database system is selected from a group consisting of number of records inserted in a table, number of records updated in the table, number of records deleted from the table, type of attribute values of the table, and length of columns of the table;
inputting the current state to the machine leaning model for adjusting the configurable parameter;
receiving a data change request for applying a change to the table of the target database system;
determining a size of the requested change;
selecting by the data synchronization system an application algorithm of multiple predefined application algorithms by comparing the determined size with the adjusted configurable parameter;
applying the requested change using the selected application algorithm;
receiving another data change request for applying a change to the table;
determining using change history event data whether a change related event has occurred in the target database system;
based on determining the change related event occurred, repeating for the other change the determination of the size and the adjustment of the configurable parameter for providing a readjustment of the configurable parameter; and
applying the other change using the readjusted configurable parameter in case the change related event occurred, otherwise applying the other change using the previously adjusted configurable parameter.

14. The computer program product of claim 13, further comprising:
repeatedly performing the determining step and the adjusting step on a time periodic basis.

15. The computer program product of claim 13, further comprising:
determining using change history event data whether a change related event has occurred in the target database system; and
based on determining the change related event occurred, repeating the determining step and the adjusting step.

16. A computer system for applying changes into tables of a target database system using a data synchronization system, the data synchronization system being configured to automatically use at least one configurable parameter for applying a requested change in the target database system, the computer system being configured for:
providing a machine learning model, the machine learning model being configured to adjust the at least one configurable parameter based on a workload level, wherein the machine learning model employs Q-learning algorithm with a Q-table, wherein the Q-table is updated using bellman equation;
determining a current workload level at the target database system;
using the machine learning model for adjusting the at least one configurable parameter according to the determined workload level;
determining a current state of the target database system, wherein the current state of the target database system is selected from a group consisting of number of records inserted in a table, number of records updated in the table, number of records deleted from the table, type of attribute values of the table, and length of columns of the table; and
inputting the current state to the machine leaning model for adjusting the configurable parameter;
receiving a data change request for applying a change to the table of the target database system;
determining a size of the requested change;
selecting by the data synchronization system an application algorithm of multiple predefined application algorithms by comparing the determined size with the adjusted configurable parameter;
applying the requested change using the selected application algorithm;
receiving another data change request for applying a change to the table;
determining using change history event data whether a change related event has occurred in the target database system;
based on determining the change related event occurred, repeating for the other change the determination of the size and the adjustment of the configurable parameter for providing a readjustment of the configurable parameter; and
applying the other change using the readjusted configurable parameter in case the change related event occurred, otherwise applying the other change using the previously adjusted configurable parameter.

17. The computer system of claim 16, further comprising:
repeatedly performing the determining step and the adjusting step on a time periodic basis.

18. The computer system product of claim 16, further comprising:
determining using change history event data whether a change related event has occurred in the target database system; and
based on determining the change related event occurred, repeating the determining step and the adjusting step.

19. The computer system of claim 16, wherein each table of the target database system is associated with a respective configurable parameter, wherein the machine learning model is configured for adjusting the configurable parameter of each table.

20. The computer system of claim 16, further comprising:
determining the current state of the target database system, wherein the current state being further defined by the current workload level and associated current latency level; and
inputting the current state to the machine leaning model for adjusting the configurable parameter.

* * * * *